W. B. WIGLE.
BAND WHEEL CONSTRUCTION.
APPLICATION FILED AUG. 17, 1916.

1,213,785.

Patented Jan. 23, 1917.

Inventor.
Wilson B. Wigle.

by

Atty.

UNITED STATES PATENT OFFICE.

WILSON B. WIGLE, OF FULLERTON, CALIFORNIA.

BAND-WHEEL CONSTRUCTION.

1,213,785.   Specification of Letters Patent.   Patented Jan. 23, 1917.

Application filed August 17, 1916. Serial No. 115,456.

*To all whom it may concern:*

Be it known that I, WILSON B. WIGLE, a citizen of the Dominion of Canada, residing at Fullerton, in the county of Orange, State of California, have invented new and useful Improvements in Band-Wheel Constructions, of which the following is a specification.

This invention relates to a band wheel construction, and pertains more especially to the flange thereof.

It is an object of my invention to provide a construction for band wheels whereby the arms may be secured to the flange by bolts or like means, the flange being so constructed as to make the heads of the bolts easily accessible in assembling the wheel.

It is another object of my invention to provide a band wheel flange whereby the latter may be secured to a square or polygonal shaft avoiding the necessity of keys and affording a positive connection between the shaft and the flange.

Figure 1:
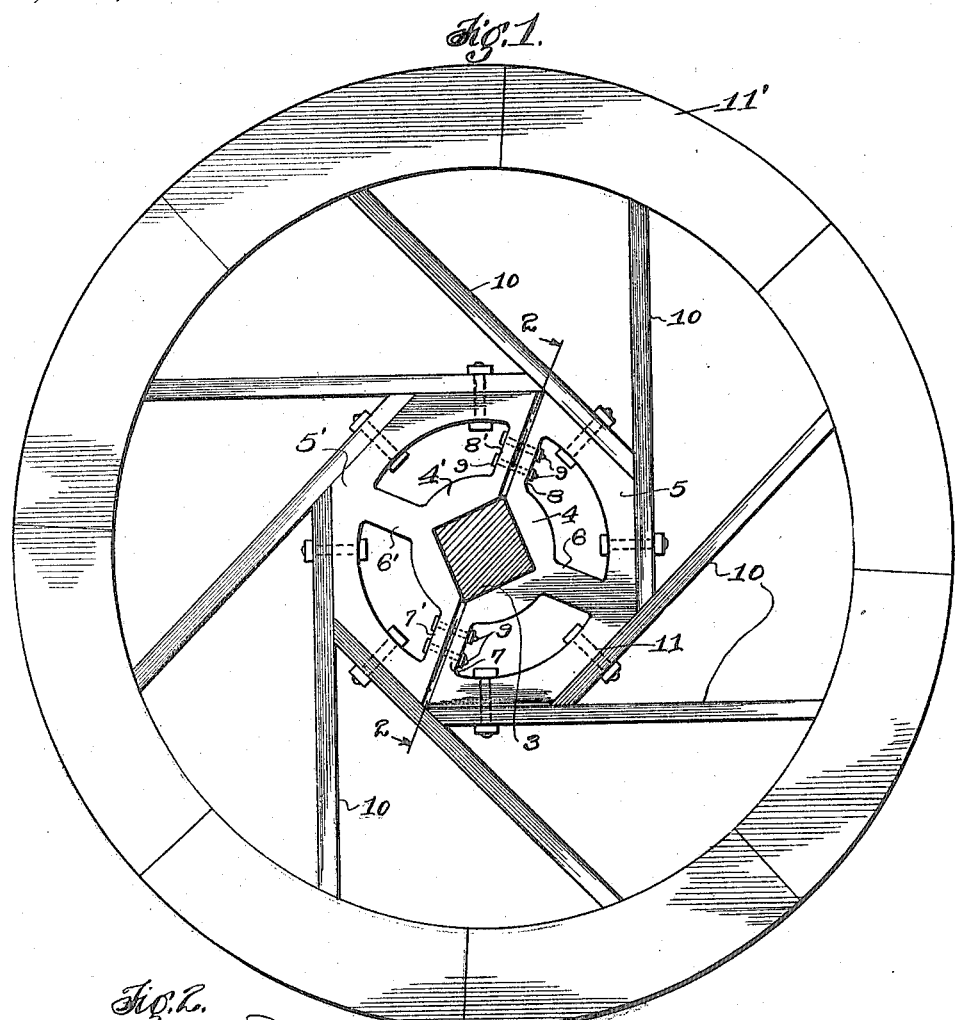
Figure 2:
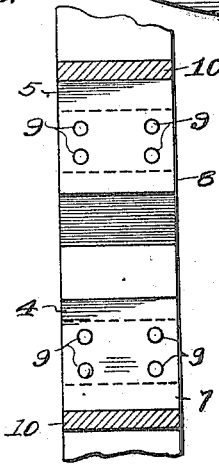

I accomplish these objects by means of the embodiment of my invention shown in the accompanying drawing, in which:

Figure 1 is a side elevation of a band wheel. Fig. 2 is a fragmentary section as seen on the line 2—2 of Fig. 1.

Referring more particularly to the drawing, 3 indicates a band wheel shaft which is square in form and may, as usual, be provided with bearings not shown herein. Mounted upon the shaft is a divided flange which is split diametrically into two halves. Each half is provided with a hub section 4 and 4' respectively secured to a flange rim 5 and 5' respectively. The securing means comprises radially extending spokes 6 and 6'. At the ends of the flange sections are spokes 7 and 7' which abut one another when assembled, and diametrically opposite are spokes 8 and 8' of similar form. The flange is clamped to the shaft and the halves to each other by bolts 9 which pass through apertures in the abutting spokes 7 and 7' and 8 and 8'. Openings are formed between the spokes thereby providing access to the heads of the bolts and the nuts so that the same may be tightened.

The periphery of the flange is preferably of polygonal form and so arranged that tangential arms 10 may be mounted thereon. The arms are preferably secured to the flange rim by means of bolts 11 having heads disposed within the openings in the flange, and the corresponding nuts mounted on the outside of the spokes.

Secured to the ends of the arms 10 are cants 11' which when assembled form the rim of the band wheel.

My improved band wheel is easily assembled and easily removed from the shaft. The clamping of the wheel to the shaft is positive, and does not require keys which soon work loose and create trouble.

What I claim is:

1. In a band wheel for a square shaft, a divided collar having a rim and a hub spaced therefrom and secured thereto by spokes forming openings therebetween, said rim being arranged to receive tangential arms and having apertures communicating with said openings for bolting the arms to said rim, and means for securing the sections of said collar together and clamping the same to said shaft.

2. In a band wheel for square shafts, a divided collar comprised of sections, each section having a hub portion arranged to seat upon said shaft and a rim spaced from said hub portion and secured thereto by spokes, thereby forming openings between said hub and said rim, each section having a spoke arranged to abut the spoke on an adjacent section when assembled, means on said last mentioned spokes for securing together said sections and clamping them upon said shaft, said rim being arranged for mounting arms tangentially thereon, and having apertures communicating with said openings for receiving bolts to clamp the arms thereto.

3. A band wheel for a square shaft, comprising a divided collar having a rim and a hub spaced therefrom and secured thereto by spokes forming openings therebetween, said rim being of polygonal shape and having apertures communicating with said openings, arms mounted on said rim tangential thereto, bolts in said apertures securing said arms to said rim, and a wheel rim mounted upon said arms.

4. A band wheel for square shafts, comprising a divided collar formed of sections, each section having a hub portion arranged to seat upon said shaft and a rim spaced from said hub portion and secured thereto by spokes, thereby forming openings between said hub and said rim, the sections forming a polygonal prism to bolt arms on when assembling, means on said last mentioned spokes for securing together said sections and clamping them upon said shaft, said rim having apertures communicating with said openings, arms mounted on said rim tangential thereto, bolts in said apertures for securing said arms to said rim, and a wheel rim mounted upon said arms for a drive belt.

5. In a band wheel construction, a square shaft, a divided collar having a hub to conform with the square shaft and an octagonal rim spaced therefrom and secured thereto by spokes forming openings for bolting tangential arms to said rim, and means for clamping the two collar parts on said shaft.

In witness that I claim the foregoing I have hereunto subscribed my name this 11th day of Aug. 1916.

WILSON B. WIGLE.

Copies of this patent may be obtained for five cents each, by addressing the "Commissioner of Patents, Washington, D. C."